United States Patent
Tai et al.

(10) Patent No.: US 7,562,360 B2
(45) Date of Patent: Jul. 14, 2009

(54) METHOD AND SYSTEM FOR FIRMWARE DOWNLOADS

(75) Inventors: Horng-Ming Tai, Plano, TX (US); Dinghui Richard Nie, Plano, TX (US); Samir Camdzic, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 570 days.

(21) Appl. No.: 10/726,075

(22) Filed: Dec. 1, 2003

(65) Prior Publication Data

US 2005/0120343 A1 Jun. 2, 2005

(51) Int. Cl.
*G06F 9/445* (2006.01)
(52) U.S. Cl. ........................ 717/178; 717/173
(58) Field of Classification Search ................. 717/178, 717/173
See application file for complete search history.

(56) References Cited

U.S. PATENT DOCUMENTS

| | | | |
|---|---|---|---|
| 6,145,045 A * | 11/2000 | Falik et al. ................... 710/310 |
| 6,311,294 B1 * | 10/2001 | Larky et al. ................... 714/44 |
| 6,357,021 B1 * | 3/2002 | Kitagawa et al. ............... 714/41 |
| 6,415,342 B1 * | 7/2002 | Wahl et al. .................... 710/100 |
| 6,467,087 B1 * | 10/2002 | Yang .......................... 717/168 |
| 6,516,359 B1 * | 2/2003 | Kurihara et al. ............... 710/52 |
| 6,574,309 B1 * | 6/2003 | Chea et al. ..................... 379/9 |
| 6,622,246 B1 * | 9/2003 | Biondi ....................... 713/100 |
| 6,708,231 B1 * | 3/2004 | Kitagawa .................... 710/10 |
| 6,898,751 B2 * | 5/2005 | Aikawa et al. .............. 714/748 |
| 6,907,602 B2 * | 6/2005 | Tsai et al. .................... 717/168 |
| 6,944,854 B2 * | 9/2005 | Kehne et al. ................. 717/168 |
| 6,996,708 B1 * | 2/2006 | Belknap ........................ 713/2 |
| 7,000,057 B1 * | 2/2006 | Novell et al. ................. 710/306 |
| 2003/0217254 A1 * | 11/2003 | Page et al. ...................... 713/2 |

* cited by examiner

*Primary Examiner*—Wei Y Zhen
*Assistant Examiner*—Phillip H Nguyen
(74) *Attorney, Agent, or Firm*—William B. Kempler; W. James Brady; Frederick J. Telecky, Jr.

(57) ABSTRACT

A method and system for downloading firmware by a device controller from a data source while connected to a host. The device controller connects to the host and waits for a signal or communication from the host. The device controller responds to the signal or communication with a negative acknowledgement (NAK), and downloads data for a predetermined period of time based on the request signal or communication type received from the host. The device may use a pointer to track the progress of the download. Once the device has completed the download, the device responds normally to the host.

15 Claims, 3 Drawing Sheets

METHOD AND SYSTEM FOR FIRMWARE DOWNLOADS

TECHNICAL FIELD

The present invention generally relates to data downloading and more particularly to firmware downloading while connected to a host.

BACKGROUND OF THE INVENTION

Application code (e.g., firmware) for peripheral devices (e.g., Universal Serial Bus (USB) compatible devices) is commonly stored in an on-board non-volatile memory device, such as an Electrically Erasable Programmable Read Only Memory (EEPROM) external to a microcontroller unit (MCU) of the peripheral device. Although employing an external EEPROM provides good field programmability and upgrade capability, downloading the firmware during the Micro Controller Unit's (MCU) power-on boot time is time consuming for some applications. As defined by the Universal Serial Bus (USB) standard, version 2.0 (USB 2), a bus powered device is allowed to spend one hundred milliseconds (100 ms) for external descriptor and firmware downloading after power up and prior to signal connect. For many applications this is not enough time.

For example, the ubiquitous, low cost and widely available I2C EEPROM can be used to store firmware for USB compatible devices. However, the typical I2C EEPROM has either a 100K bit/sec or 400K bit/sec data transfer rate. Thus, a typical 32K-byte firmware download takes 720 milliseconds to complete even when using the 400K bit/sec data transfer rate, which far exceeds the maximum 100 millisecond time requirement allowed by the USB specification.

A current solution for USB devices requires a dummy boot loader and host utility/driver software to first enumerate the dummy boot loader which then starts the firmware downloading process. Enumeration is the process of determining what device has just been connected to the bus and what parameters it requires such as power consumption, number and type of endpoint(s), class of product, etc. The host will then assign the device an address and enable a configuration allowing the device to transfer data on the bus.

After the dummy boot loader finishes the downloading, it performs a pseudo disconnect and re-connect to the USB host controller to re-enumerate the USB peripheral device to a device that matches the functionality defined by the firmware downloaded. A disadvantage of this solution is that the special dummy boot loader requires additional boot code development. Another disadvantage to this solution is that it is necessary to develop a custom host/utility driver software for each operating system. Yet another disadvantage of this solution is potential side effects from the dynamic disconnect and reconnect to the USB host controller because different operating systems can react differently with respect to software timing issues.

SUMMARY OF THE INVENTION

The present invention is directed to a method and system for downloading data while connected to a host. For example, the present invention can be executed by a microcontroller of a Universal Serial Bus (USB) compatible device that is downloading application firmware from a non-volatile memory.

One aspect of the present invention is a method for a device to download data from a data source while connected to a host. The method comprises connecting to a host and waiting for a request signal from the host, responding to the request signal with a negative acknowledgement (NAK) to intentionally postpone a response to the request signal, and downloading data from the data source for a predetermined time period based on the request signal.

Another aspect of the present invention relates to a method for a Universal Serial Bus (USB) device to download application firmware while connected to a USB host. The method includes connecting to a USB host and waiting for a request signal from the USB host. Data blocks associated with firmware are downloaded from a data source based on a predetermined time period associated with the request signal type. The waiting for a request signal and the downloading data blocks from the data source is repeated, until the downloading of the firmware is complete.

Another aspect of the present invention relates to a universal serial bus (USB) compatible device. The USB compatible device includes a non-volatile memory (e.g., an EEPROM) having firmware stored therein, and a microcontroller unit (MCU). The MCU configures the device such that the device responds with a negative acknowledgement (NAK) in response to a request signal from a host controller, until downloading of firmware to the MCU has completed.

BRIEF DESCRIPTION OF THE DRAWINGS

The foregoing and other aspects of the present invention will become apparent to those skilled in the art to which the present invention relates upon reading the following description with reference to the accompanying drawings.

DETAILED DESCRIPTION

Figure 1:
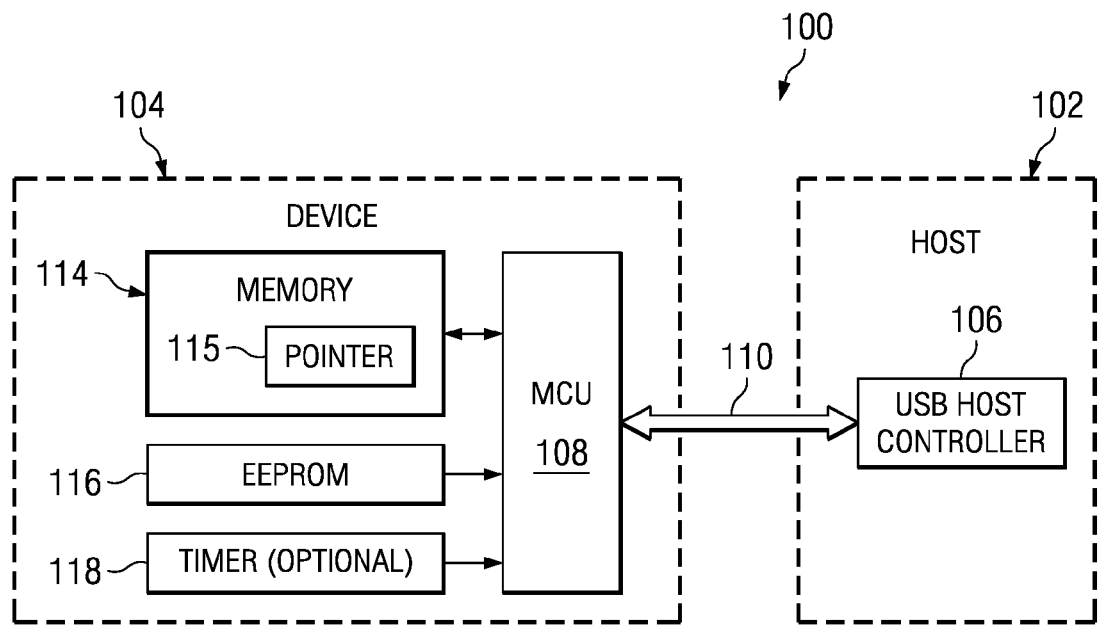
FIG. 1 is a block diagram schematically illustrating an exemplary system in accordance with an aspect of the present invention.

The present invention is directed to a method and system for enabling a device to download data (e.g., application firmware) from a data source (e.g., an EEPROM), while the device (e.g., a USB compatible peripheral device) is connected to a host (e.g., a USB controller). When the device desires to download data from the data source (e.g., at power up, at device reset), the device waits for a request signal from the host. The request signal is a request for identification, status or data information from the device. The device responds with a negative acknowledgement (NAK) to intentionally postpone transmission of the response to the request signal. The device downloads data from the data source for a predetermined period of time based on the type of request signal received from the host.

The device will repeat the process of transmitting a NAK and downloading data from the data source for a predetermined period of time based on the type of request signal received from the host, until the data download is complete. Once the device has completed the download, it responds normally to the host. The device may use a pointer to track the progress of the download. The pointer may contain the address of the last block of data downloaded, or alternatively the address of the next block of data to be downloaded.

The request signal may be a control transfer. The Universal Serial Bus specification, version 2.0 (USB 2) uses control transfers to exchange device configuration and other information between the device and the host. The control transfer is initiated by the host. As defined by the USB 2 specification, any USB peripheral device is required to return data to the USB host controller within 500 milliseconds when the control transfer has a data stage (data request). If the control transfer is a status request, the peripheral device is required to return status information to the USB host controller within 50 milliseconds.

An aspect of the present invention is to determine whether a control transfer is a data request or a status request and to use the time allotted for responding to the request for downloading firmware. For example, if it is determined that a control transfer is a data request, the device sends a NAK handshake to the USB host and utilizes the allotted 500 milliseconds of time to respond to the request to download firmware from the data source. If the USB host is asking for status information, the mechanism issues a NAK handshake to the USB host, while utilizing the allotted 50 milliseconds of time for firmware downloading.

There are at least two USB control transfers requiring a data stage, which are the Get Device Descriptor and Get Configuration Descriptor. By using the time allotted to respond to these two requests for downloading firmware, the present invention enables the boot code to secure at least 1000 milliseconds for firmware downloading, providing ample time for a typical 32 K byte firmware download that is compatible with USB compatible peripherals using a non-volatile memory, such as an I2C EEPROM, other EEPROM devices, or flash memory.

The present invention does not require a special dummy boot loader, which simplifies boot code development. The present invention does not require a special host utility/driver, thus providing an operating system independent method and system. Another aspect of the present invention is that the device does not have to disconnect and re-connect to the USB host controller.

FIG. 1 illustrates an exemplary system 100 in accordance with an aspect of the present invention. The system 100 comprises a USB host 102 and a USB device 104. The host 102 comprises a USB host controller 106. The device 104 comprises a microprocessor based microcontroller unit (MCU) 108. The USB device 104 has memory 114 (e.g., RAM), an EEPROM 116, and, optionally, a timer 118. Memory 114 is used by MCU 108 for storing application code and data during operation of the USB device 104. EEPROM 116 is used to store application code and/or data to be downloaded to memory 114 at boot up of the USB device 104. Pointer 115 may be used to track the progress of the download. Pointer 115 can contain the location of the last block of data read or the next block of data to be read. Timer 118 can be used by MCU 108 to determine elapsed download time. Although memory 114, EEPROM 116 and timer 118 are shown as being contained within device 104, it is not necessary that they be contained within device 104 as long as MCU 108 can maintain communication with the memory 114, EEPROM 116 and timer 118. Memory 114, EEPROM 116 and timer 118 may be remotely located. Interface 110 is used for communication between the MCU 108 and the USB host controller 106. Interface 110 may be any standard wired or wireless communication interface.

Upon power up or reset, MCU 108 executes a portion of a boot program, which may be stored in a non-volatile memory (e.g., an EEPROM) 116. Optionally, the boot program may be stored on an internal non-volatile memory (not shown). The portion of the boot program provides the MCU 108 with sufficient program code to communicate with host 102. USB 2 allows MCU 108 to spend one hundred milliseconds (100 ms) for external descriptor and firmware downloading after power up and prior to signal connect. MCU 108 may use this time to begin downloading firmware from EEPROM 116. Pointer 115 would be set to the address the last block read or the next block to be read from EEPROM 116. MCU 108 then connects via interface 110 to USB host controller 106. MCU 108 then waits for USB host controller 106 to initiate a control transfer.

Once a control transfer is initiated, the MCU 108 responds to the USB host controller 106 with a NAK, determines the type of control transfer, uses the time allotted for responding to the control transfer to download firmware from EEPROM 116, and updates pointer 115 accordingly. For example, if the control transfer is a data request type, the download time is based on a first time period (e.g., 500 ms). If the control transfer is a status request type, the download time is based on a second time period (e.g., 50 ms). The firmware can be downloaded based on a respective predetermined time period by employing the timer 118 to monitor the download time. Alternatively, a predetermined number of data blocks or packets can be downloaded within the respective predetermined time period based on one or more downloading parameters (e.g., download data rate, download time period, download block or packet size).

If the download is not completed, MCU 108 waits for another control transfer and again responds to the control transfer with a NAK, determines the type of control transfer, using the time allotted for responding to the control transfer to download firmware from EEPROM 116, and updates pointer 115 accordingly. This process repeats until the firmware download is complete. Once the firmware download is complete MCU 108 executes the downloaded application code and responds to subsequent signal request by the host in a normal manner.

Figure 2:
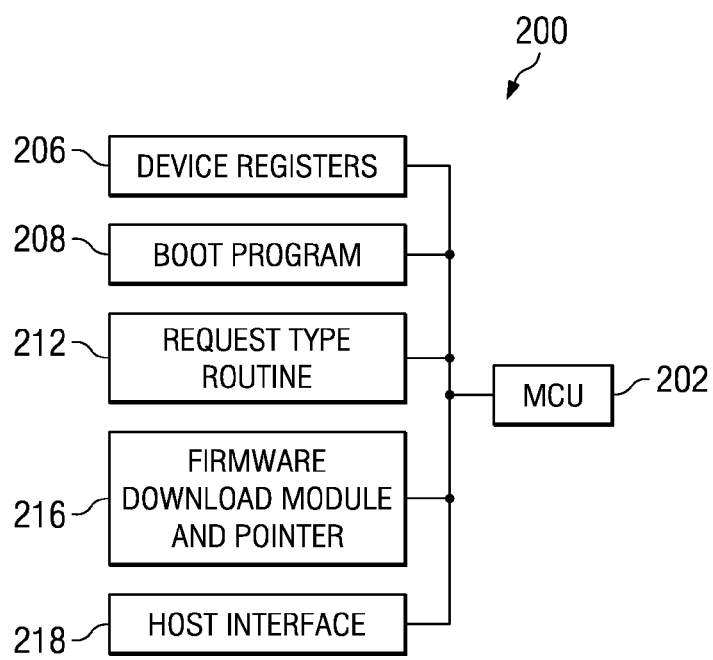
FIG. 2 is a block diagram illustrating the functional components in accordance with an aspect of the present invention.

FIG. 2 illustrates the functional components (e.g., hardware and/or software) coupled to a MCU 202 associated with a USB compatible device in accordance with an aspect of the present invention. The functional components include one or more device registers used by the USB compatible device to exchange data with MCU 202, and to allow the MCU 202 to set operating parameters for the USB compatible device. For example, when booting up MCU 202 may set the device registers 206 such that the USB compatible device automatically responds to signals from the USB host controller 106 with a NAK, until firmware download is completed. After the firmware download is completed, MCU 202 can set the device registers 206 for normal communications.

A boot program 208 is provided that contains the bootstrap program for MCU 202. Boot program 208 can be stored in non-volatile random access memory (NV-RAM), such as a boot ROM. Alternatively, a portion of boot program 208 can be stored in boot ROM and the remainder of the boot program 208 can be stored elsewhere such as an EEPROM located locally or remotely, providing that the boot program stored in the boot ROM is sufficient to enable the MCU 202 to communicate with the EEPROM A request type routine 212 determines the request type of the request signal by the host (not shown) and sets a time period for firmware downloading based on the request type. The request type routine 212 can also determine the number of data blocks to be downloaded in the set time period.

Host interface 218 handles communication between the MCU 202 and the host (not shown). Firmware download module and pointer 216 handles the actual downloading of data, such as application firmware, from a data source. The pointer (not shown) is used to track the progress of the download and may store either the address of the last block of data downloaded or the address of the next block of data to be downloaded.

While, for purposes of simplicity of explanation, methodologies are shown and described as executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention. Additionally, such methodologies can be implemented in hardware, software or a combination of hardware and software.

Figure 3:
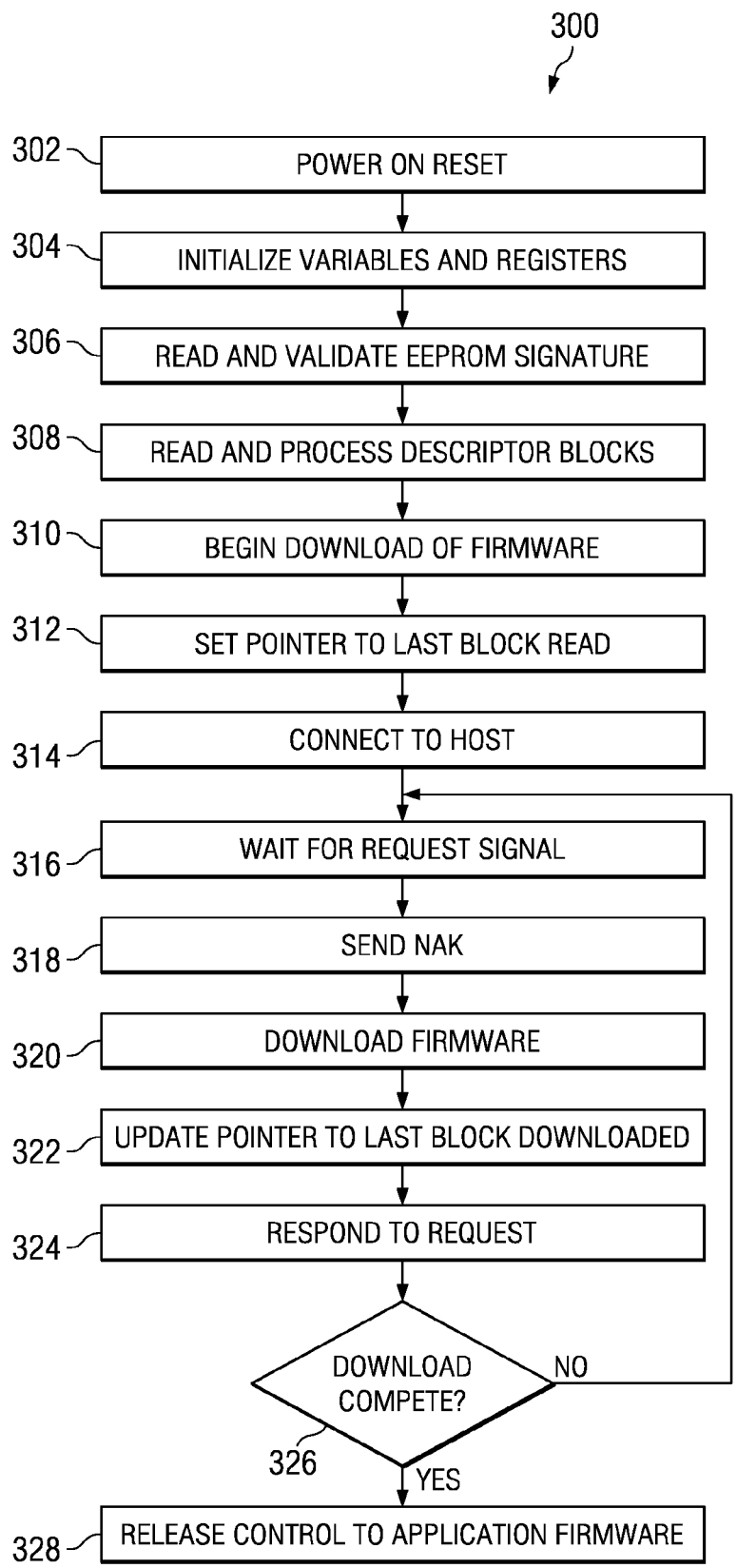
FIG. 3 is a flow diagram illustrating a simplified boot code program flow in accordance with an aspect of the present invention.

FIG. 3 is a block diagram illustrating a methodology 300 for performing a firmware download of a USB device in accordance with an aspect of the present invention. The firmware can comprise one or both of a boot program (e.g., the program which initializes the device and enables the device to communicate with the host) and an application program. A power on reset occurs at 302. This may occur when the device is plugged into a USB host or if the device is connected to a USB host, when the USB host powers on. At 304, the internal variables and registers for the device are initialized. This initialization can include setting the internal variables and registers to respond with a NAK, until firmware download is complete. At 306, the EEPROM signature is read and validated. At 308, descriptor blocks are read and processed. Descriptor blocks have a data structure that tells the host about the device's configuration and expectations. Descriptors include transfer type, max size of data packets, perhaps the interval for data transfers, and in some cases, the bandwidth needed. The methodology then proceeds to 310.

At 310, the device begins downloading firmware. USB 2 allows a device 100 milliseconds for descriptor and firmware downloading after power up and prior to signal connect. Therefore, the device would have about 100 milliseconds, the time that was spent to read and process the descriptor blocks at 308, to download firmware. At 312, a pointer is set to the address of the last block of firmware downloaded. Alternatively, the pointer may be set to the address of the next block of firmware to be downloaded. The methodology then advances to 314.

At 314, the MCU connects to the host, for example, by transmitting identification information to the host during initialization. At 316, the MCU waits for a request signal from the host. For example, a request signal can be a data request signal type or a status request signal type. Once the MCU receives a request signal from the host, the MCU responds with a NAK at 318. The NAK intentionally postpone transmission of the response to the request signal. At 320, firmware is downloaded from the EEPROM for a predetermined time period. The predetermined time period depends on the type of request signal (e.g., 500 milliseconds for a data request and 50 milliseconds for a status request). A predetermined number of data blocks or packets can be downloaded based on the predetermined time period and one or more additional downloading parameters (e.g., download data rate, download block or packet size).

A pointer that is tracking the progress of the firmware download is then updated at 322. At 324, the MCU sends a response to the request to the host. At 326, it is determined whether the firmware download is complete. If at 326, it is determined that the firmware download from the EEPROM is not complete (NO), the MCU returns to 316 to wait for another request signal. If at 326, the firmware download is determined to be complete (YES), the methodology proceeds to 328. At 328, control is released to the application firmware.

Figure 4:
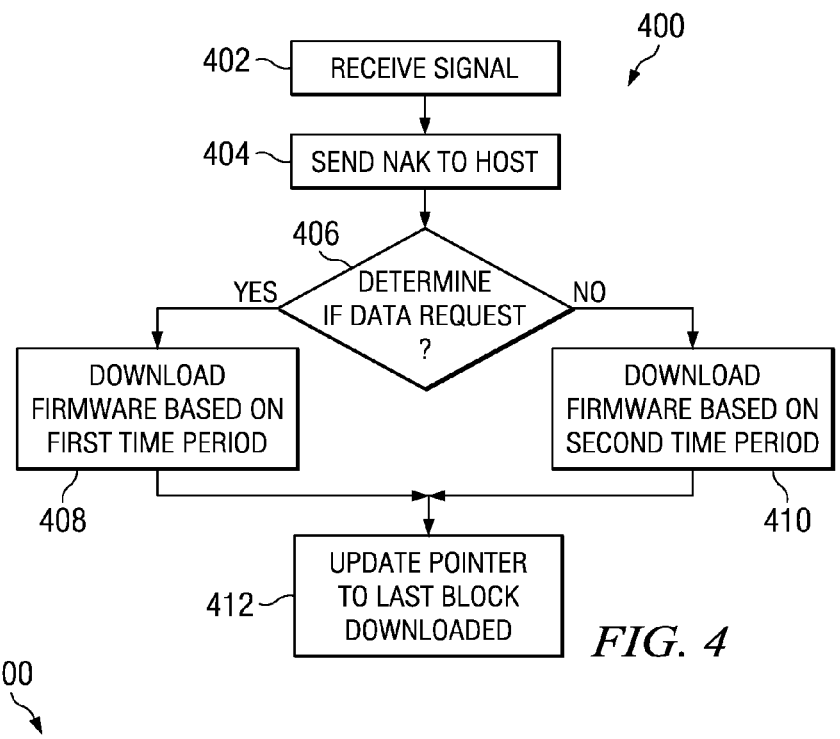
FIG. 4 is a partial flow diagram of a process that occurs when a request signal is received by an MCU from a host in accordance with an aspect of the present invention.

FIG. 4 is a partial flow diagram of a process 400 that occurs when a request signal is received by an MCU from a host in accordance with an aspect of the present invention. At 402, a request signal is received by the MCU. The MCU responds by sending a NAK to the host at 404. At 406 it is determined whether the request signal is a data request or another type of request (e.g., a status request). If at 406 it is determined that the request signal is a data request (YES), the methodology proceeds to 408. At 408, firmware is downloaded from the data source (e.g., EEPROM) based on a first predetermined time period (e.g., 500 milliseconds). The firmware can be downloaded based on a first predetermined time period by employing a timer to monitor the download time. Alternatively, a predetermined number of data blocks or packets can be downloaded based on one or more downloading parameters (e.g., download data rate, download time period, download block or packet size). If at 406 it is determined that the request signal is not a data request (NO), the methodology proceeds to 410. At 410, firmware is downloaded from the data source (e.g., EEPROM) based on a second predetermined time period (e.g., 50 milliseconds). The firmware can be downloaded based on a second predetermined time period by employing a timer to monitor the download time. Alternatively, a predetermined number of data blocks or packets can be downloaded based on one or more downloading parameters (e.g., download data rate, download time period, download block or packet size). At 412, a pointer to the address of the last block downloaded is updated once the predetermined time period associated with the request expires.

Figure 5:
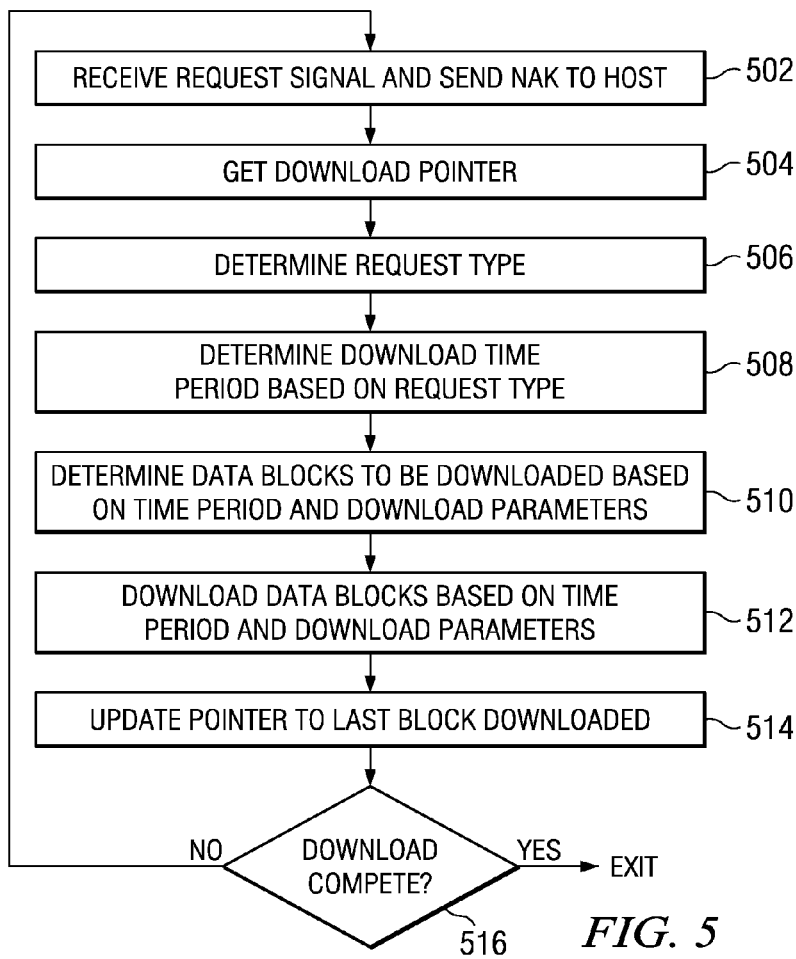
FIG. 5 is a flow diagram for a firmware download method in accordance with an aspect of the present invention.

FIG. 5 is an example illustrating a process 500 for downloading firmware to a MCU of a USB device in accordance with another aspect of the present invention. The process 500 determines the number of packets to be downloaded for a given download time period. The download data rate, download time period and packet size are employed to determine how much data is downloaded for a given download time period. The download data rate can depend on the type and speed of the USB MCU, the firmware storage medium (e.g., EEPROM) and the bus connecting the USB MCU to the firmware storage medium. The packet or block size can be constant, such as 512 bytes. The process starts at 502. At 502, a request signal from a host controller is received by the USB device. The USB device responds with a NAK to intentionally postpone the transmission of the response to the request signal.

At 504, the download pointer is retrieved associated with the last block or packet of data downloaded. At 506, the request type (e.g., status request type, data request type) is determined. At 508, a download time period is determined based on the request type. For example, the download time period can be a first time period (e.g., 500 ms) for a data request, and a second time period (e.g., 50 ms) for a status request.

At 510, the number data blocks or data packets that can be downloaded from firmware are determined based on the download time period and other download parameters (e.g., download data rate, download block or packet size). The methodology then proceeds to 510. At 512, the data blocks or data packets are downloaded from firmware based on the download time period and other download parameters (e.g., download data rate, download block or packet size). For example, a loop counter can be set to different values based on download parameters and a request type. The value of the loop counter can correspond to the number of data blocks or data packets to be downloaded in a given download period. At 514, the download pointer is updated based on the last data block or data packet downloaded. The methodology then proceeds to 516 to determine if the download has been completed. If the firmware download has not completed (NO), the methodology returns to 502 to wait for another request signal and repeat the process 500. If the firmware download has completed (YES), the methodology exits and the USB device returns to normal operation.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for a device to download a device program data from a non-volatile data source of the device to a volatile memory of the device while connected to a host, comprising the following steps performed by the device:
    connecting to a host; and in response to one of a device power up and a device reset,
    waiting for a first request signal from the host;
    responding to the first request signal with a first negative acknowledgement (NAK);
    initiating downloading the device program from the non-volatile data source of the device to the volatile memory of the device for a predetermined time period based on the request signal; and
    in response to a subsequent request signal from the host,
        (a) if the device program is not completely downloaded, sending a subsequent NAK and continuing to download the device program from the non-volatile data source of the device to the volatile memory of the device, and
        (b) if the device program is completely downloaded, responding to the subsequent request signal by executing the device program, further comprising updating a download point each time the predetermined time period is completed, wherein the predetermined time period is a first time period for a data request signal, and a second time period for a status request signal and the first time period is five hundred milliseconds and the second time period is fifty milliseconds.

2. The method of claim 1, the non-volatile data source comprising non-volatile memory.

3. The method of claim 2, the non-volatile memory is at least one of an Electrically Erasable Programmable Read Only Memory (EEPROM) and a flash memory.

4. The method of claim 2, further comprising reading a signature from the non-volatile memory and validating the signature prior to connecting to the host.

5. The method of claim 2, further comprising reading descriptor information from the non-volatile memory prior to connecting to the host.

6. The method of claim 1, further comprising setting a pointer for tracking device program data downloaded from the data source.

7. The method of claim 1, the host is a USB host and the device is a USB device.

8. The method of claim 1, wherein the predetermined time period is monitored by a timer.

9. The method of claim 1, further comprising determining and downloading a number of device program data blocks to be downloaded based on the predetermined time period.

10. The method of claim 9, wherein the number of data blocks to be downloaded being further based on at least one of a download data rate and a block size.

11. The method of claim 9, further comprising setting a loop counter based on the number of data blocks to be downloaded.

12. A universal serial bus (USB) compatible device, comprising:
    a non-volatile memory having firmware stored therein;
    a microcontroller unit (MCU)
    a volatile memory; and
    an instruction memory storing instructions for execution by the MCU upon reset, the execution of the instructions controlling the device to respond with a negative acknowledgement (NAK) in response to a request signal from a host controller, to download the firmware to the volatile memory for use by the MCU for a period of time after responding with the NAK, and to continue to respond with NAKs and to download the firmware until downloading of the firmware to the volatile memory has completed, and to execute the firmware in response to a request signal thereafter, wherein the MCU downloads data blocks associated with the firmware for a predetermined time period based on the request signal type from the host controller, the predetermined time period is a first time period for a signal with a data stage and a second time period for a signal without a data stage and the first time period is five hundred milliseconds and the second time period is fifty milliseconds.

13. The device of claim 12, further comprising a memory for storing a download pointer to track the firmware download.

14. The device of claim 12, wherein the MCU further determines the number of data blocks to be downloaded for the predetermined time period based on download data rate and a block size.

15. The device of claim 13, further comprising a timer for monitoring the firmware download.

* * * * *